United States Patent
Burts, Jr. et al.

(10) Patent No.: US 8,235,116 B1
(45) Date of Patent: Aug. 7, 2012

(54) WELL REMEDIATION USING SURFACED MIXED EPOXY

(76) Inventors: Boyce D Burts, Jr., Lafayette, LA (US); Boyce Donald Burts, III, Lafayette, LA (US); Freddie L. Sabins, Houston, TX (US); Larry Watters, Spring, TX (US)

( * ) Notice: Subject to any disclaimer, the term of this patent is extended or adjusted under 35 U.S.C. 154(b) by 0 days.

(21) Appl. No.: 11/162,453

(22) Filed: Sep. 9, 2005

Related U.S. Application Data

(60) Provisional application No. 60/608,255, filed on Sep. 9, 2004, provisional application No. 60/608,256, filed on Sep. 9, 2004, provisional application No. 60/608,257, filed on Sep. 9, 2004.

(51) Int. Cl.
*E21B 33/13* (2006.01)

(52) U.S. Cl. ................... 166/293; 166/300

(58) Field of Classification Search .............. None
See application file for complete search history.

(56) References Cited

U.S. PATENT DOCUMENTS

| 4,921,047 A | * | 5/1990 | Summers et al. | 166/276 |
| 5,875,846 A | * | 3/1999 | Chatterji et al. | 166/293 |
| 5,969,006 A | * | 10/1999 | Onan et al. | 523/166 |

OTHER PUBLICATIONS

"Physical Properties Guide for Epoxy Resins and Related Products," Resolution Performance Products, www.resins.com, 2001.*

* cited by examiner

*Primary Examiner* — Zakiya W Bates
(74) *Attorney, Agent, or Firm* — Gilbreth Roebuck, PC; J. M. (Mark) Gilbreth

(57) ABSTRACT

A two part epoxy resin system is surface mixed in a method of remediating an active well. This surface mixed epoxy resin is then placed in the well at the desired remediation depth. Finally, the mixture in situ forms a cement plug.

5 Claims, No Drawings

WELL REMEDIATION USING SURFACED MIXED EPOXY

This application claims priority/benefit of U.S. Provisional Patent Application Ser. Nos. 60/608,255, 60/608,256, and 60/608,257, all filed Sep. 9, 2004, and all herein incorporated by reference.

BACKGROUND OF THE INVENTION

1. Field of the Invention

The present invention relates to wells, well operations, to methods, apparatus and products for operating wells. In another aspect, the present invention relates to wells, remediated wells, remediation of wells, to methods, apparatus and products for remediating wells, including oil, gas, water, geothermal, or analogous wells.

2. Brief Description of the Related Art

The hard impermeable mass deposited in the annular space in a well by primary cementing processes is subjected to a number of stresses during the lifetime of the well. The pressure inside the casing can increase or decrease as the fluid filling it changes or as additional pressure is applied to the well, such as when the drilling fluid is replaced by a completion fluid or by a fluid used in a stimulation operation. A change of temperature also creates stress in the cement, at least during the transition period before the temperatures of the steel and the cement come into equilibrium. It can become necessary to repair the primary cementing mass.

It is sometimes desirable in production of oil wells to place cement through perforations in the casing of the well both below and above the oil producing formation or zone. This cementing is carried out to prevent water and/or gas from migrating to the wellbore along with the oil. The intent is to leave the water and gas in the formations adjacent to the oil producing zone so that the water and gas will drive the oil to the wellbore, thereby increasing recovery of oil.

Squeeze cementing is a process of forcing a cement composition through perforations, holes or splits in a casing/wellbore annular space of a well in order to repair a primary cement job that failed due to the cement bypassing the mud (channeling); to eliminate water intrusion from above, below or within the hydrocarbon-producing zone; to reduce the producing gas to oil ratio by isolating gas zones from adjacent oil intervals; to repair casing leaks due to a corroded or split pipe; to plug all, or part, of one or more zones in a multizone injection well so as to direct the injection into the desired intervals; and to plug and abandon a depleted or watered-out producing zone.

Due to high pressures involved, squeeze cementing can be accompanied by problems such as propagating fractures. In addition, the use of conventional Portland cement has several potential problems of its own, particularly where high strength and good adhesion to the borehole wall are needed in order to effect good sealing. The presence of drilling mud pockets on channels under the primary cement may not only lead to failure of the primary cement job, but can adversely affect the strength of the squeeze cementing job. In addition, the presence of brine in the well can adversely affect both the primary and remedial cement jobs, increasing setting time and causing loss of strength of the cement.

U.S. Pat. No. 5,178,519, issued Jan. 12, 1993, to Striech et al., discloses a method and apparatus for performing a block squeeze cementing job. The invention provides for perforating the wellbore above and below the desired well formation on a single wireline trip and setting a lower packer on a wireline above the lower perforations. A stinger is positioned in the lower packer, and secondary packer elements on an upper packer are set above the upper perforations. Cementing of the lower perforations is carried out through the lower packer. The secondary packer elements are unset, and the stinger is repositioned adjacent to the upper perforations. Primary packer elements on the upper packer are then set, and the cementing of the upper perforations is carried out through the upper packer and stinger. Setting of the secondary packer elements requires only vertical movement of the tubing string and no rotation. Both cementing steps are carried out on a single tubing trip. The upper packer is retrievable, and the lower packer is of a drillable type. Hydraulic slips may be provided on the upper packer to prevent movement thereof during either cementing operation.

U.S. Pat. No. 6,065,539, issued May 23, 2000 to Noik et al., discloses a method of cementing a casing in a well drilled in the ground comprises injecting a liquid material comprising phenol-formol resin from the surface, wherein the resin is modified by means of a determined amount of furfuryl alcohol, and an amount of mineral filler unreactive towards the resin is added. The invention further relates to a thermosetting cementing material comprising phenol-formol resin. The resin is modified by means of an amount of furfuryl alcohol and comprises at least a proportion of an unreactive granular filler.

U.S. Pat. No. 6,591,909, issued Jul. 15, 2003 to Dao et al., discloses a method and composition is provided using whey protein as a retarder in a cementing composition for use in cementing operations in a subterranean zone penetrated by a well bore.

U.S. Pat. No. 6,767,867, issued Jul. 27, 2004 to Chatterji et al., discloses methods of treating subterranean zones penetrated by well bores in primary well cementing operations, well completion operations, production stimulation treatments and the like. The methods are basically comprised of introducing into the subterranean zone an aqueous well treating fluid comprised of water and a water soluble polymer complex fluid loss control additive.

U.S. Pat. No. 6,899,177, issued May 31, 2005 to Chatterji et al., discloses methods of cementing subterranean zones penetrated by well bores using cement compositions having enhanced compressive strengths are provided. A method of the invention basically comprises the steps of preparing or providing a cement composition having enhanced compressive strength upon setting comprising a hydraulic cement, sufficient water to form a slurry and a hydroxyamine compressive strength enhancing additive. Thereafter, the cement composition is placed in a subterranean zone to be cemented and allowed to set into an impermeable solid mass therein.

In spite of the advances in the prior art, conventional cement systems suffer from a 6 hour safety margin to dump the slurry; long set times; low shear bond values; long cement lengths, and long wait on cement (WOC) times causing high expense.

Thus, there still exists a need in the art for improved methods, apparatus and products for remediating wells.

SUMMARY OF THE INVENTION

According to one embodiment of the present invention, there is provided an active well (i.e, it's not abandoned) comprising a well bore, and a cementing plug comprising a polymeric composition, preferably an epoxy composition.

According to even another embodiment of the present invention, there is provided a method of remediating an active well. The method includes providing a two component polymeric cementing system, preferably an epoxy system, surface mixing the two component system, and then placing the mixed system in the well.

According to still another embodiment of the present invention, there is provided a method of remediating an active well. The method includes providing a two component polymeric cementing system, preferably an epoxy system, surface mixing the two component system, and then placing the mixed system in the well, and finally allowing the formation of a cement plug to plug the well.

DETAILED DESCRIPTION OF THE INVENTION

The method of the present invention for remediating an active well involves the use of a two part plugging composition, which is incorporated into known plugging methods. As used herein "active well" refers to any well that is not an abandoned well or one that is not undergoing abandonment. For example, a well during the process of drilling, an operating producing well, and the like.

The method of the present invention for remediation of an active well involves the use of a two part plugging composition, which is incorporated into known plugging methods.

In particular, the two part plugging composition of the present invention comprises a two polymeric cementing system comprising a polymeric component and an activator component. The polymeric component will in the presence of an activator component be set up, reacted, hardened, cured, catalyzed or crosslinked into a cementing plug.

The polymeric component utilized in the present invention may be any material suitable polymeric material for forming a cementing plug that will adequately plug that abandoned well. Examples of suitable polymeric systems include that described in the references cited herein, all references of which are herein incorporated by reference. This polymeric component may comprise a thermoplastic or thermoset, that is water soluble or insoluable. Preferably, this polymeric component is an epoxy resin.

In the present invention, the polymeric system not only contains the polymeric material and activator, but may optionally include additives to improve thermal stability, control set time, generate expansion, and control fluid loss. The additives may be incorporated into the system directly, or into one or both of the components.

Any suitable polymeric system may be utilized, with epoxy systems being preferred. In selecting a suitable polymeric system, it is desired that the system exhibit one or more, preferably several if not all, of the following characteristics: liquid system that is solid free, no shrinkage upon set up, maintains (or causes an increase in) the wellhole pressure; hydrophobic; density allows it to fall thru the well fluid at a suitable rate; and non-gas generating (so as not to cause micro channels).

As utilized in the present invention, the activator component serves not only to activate, set up, crosslink and/or cure the polymeric compound, but also to accelerate such, so as to reduce the wait on cement (WOC) time. The activator causes the sealant to set under downhole temperature and pressure conditions at an accelerated rate. Of course, this activator component will have to be carefully selected depending upon the material utilized as the first component.

In the present invention, accelerated set times are generally less than 12 hours, preferably less than 10 hours, more preferably less than 8 hours, even more preferably less than 6 hours, still more preferably less than 4 hours, and yet more preferably less than 2 hours.

The activator will cause the polymeric sealant to set under downhole conditions to cause the sealant to bond to the casing and or other formation surfaces in the well. The pipe may have coating of oil or water based drilling mud.

The activator component may be selected to not only accelerate cement set, but may optionally be selected to also alter slurry density, clean downhole surfaces, and/or improve bond.

The activator will be selected for its known property for accelerating the setup, activation, cure, crosslinking, of the polymeric material. For the preferred epoxy resin system, activators for epoxies are well known, and any suitable one may be utilized. In many instances paired resin-activator systems are commercially available.

Examples of commercially available materials follows and possible formulations follow. All materials are Benchmark. All are manufactured by Resolution Chemicals. Concetrations are parts by weight.

Materials: Epon 862 or 863-resin, Epicure 3046 low-temp hardener, Epicure W high temp hardener, Heloxy 7-primary reactive diluent, CarDura E10P-secondary, high-temp diluent. Formulations: (1) 100 Epon 862 or 863+17 to 40 Epicure 3046 good 50 F to 100 F; (2) 100 Epon 862 or 863+20 to 50 parts Heloxy 7+20 to 40 parts Epicure 3046 good 70 F to 125 F; (3) 100 Epon 862 or 863+20 to 50 parts Heloxy 7+10 to 20 parts Epicure 3046+10 to 20 parts Epicure W good 125 to 175 F; (4) 100 parts Epon 862 or 863+0 to 50 parts Heloxy 7+17 to 35 parts Epicure W good from 175 to 250 F; (5) 100 parts Epon 862 04 863+30 to 50 parts Heloxy 7+15 to 25 parts Epicure W+0 to 20 parts CarDura E10P good from 250 to 350 F.

The present invention also contemplates the use of two or more activator systems, generally selected to operate at various temperatures to assist in controlling any set, activation, curing, or crosslinking. A blend of polymeric material may also be utilized.

The method of the present invention for remediation of wells, includes any of the known remediation methods in which is utilized the two component plugging composition as the cementing material. While a generalized plugging method is described below, it should be understood that any suitable remediation method as is known in the art, including any described above in the background or described in any cited reference (all of which are herein incorporated by reference), may be utilized with the plugging composition of the present invention.

The cementing compositions of the invention are useful in a number of repair and remediation cementing operations including those operations to plug lost circulation and other undesirable fluid inflow and outflow zones in wells, to plug cracks and holes in pipe strings cemented therein and to accomplish other required remedial well operations. Generally, these repair and remediation cementing processes used in a well during its productive life are referred to as secondary cementing. In the practice of the present invention the compositions of the present invention may be utilized in any known secondary cementing method including any of the remediation cementing methods disclosed in any of the references cited herein, all of which are herein incorporated by reference.

In general secondary cementing is carried out by placing components of a cementing composition from a source at the ground surface downhole to the point of repair and/or remediation. The components of the cementing composition are then allowed to set into a hard impermeable mass. Any method known in the art for placing and/or positioning components of a cementing composition downhole at the point of remediation may be used herein, all of which are herein incorporated by reference.

Generally in the practice of the method of the present invention, the resin component and the activator component is mixed at the surface and then placed downhole at the desired location of the plug and allowed to form into a plug.

Preferably, in the practice of the present invention, epoxy system is e heavier than the well fluid to allow gravity flow thru the well fluid to the plug location.

Any suitable apparatus and method for the delivery of the components may be utilized. As non-limiting examples, suitable delivery systems may utilize a dump bailer, coiled tubing and jointed tubing. They require a base to stack up against such as a packer, petal basket or sand plug. While any suitable delivery mechanism can be utilized, more specific non-limiting examples of suitable delivery mechanisms include: dump bailer run on electric line or slick line; pumping through tubing, drillpipe, work strings or any tubulars; allowing fall through fluids via gravity; and pumping into an annullas or pipe without displacing (i.e., "bull heading").

In some instances epoxy system will not have suitable density, specifically, the density may not be greater than that of the well fluid.

The present invention provides for the utilization of weighting agent additives to the first component or the second component, or to the resultant combined system, to change the density of the mixed system. Suitable additives to change the density include metal salts, preferably calcium chloride. Other examples of weighting agents include sand, barite, hemitite, calcium carbonate, FeO, MgO, and manganese ore. Sufficient amounts of the additive are utilized to achieve the desired density.

In the remediation method of the present invention the first and second components are surface mixed. The mixed components are then introduced into the well fluid at a position on top of sand/petal basket to allow for in-situ formation of the cement plug to plug the well.

It should be appreciated that at some point, the density differential between the polymeric system and the well fluid is so low as to result in too slow of displacement.

On the other hand, it should further be appreciated that at some point, the density differential between the system and the well fluid is so great as to result in problems.

Thus, the density differential should be selected so as to provide suitable gravity feed of the system thru the well fluid to the desired location.

Typical densities for the well fluid will be in the range of about 8.33 ppg up to about 20.0 ppg, with typical densities for the activator in the range of about 8.33 ppg up to about 21.0 ppg, and with typical densities for the sealant system in the range of about 8.54 up to about 22.0 ppg.

It should be understood that other well fluid additives as are well known in the art may be incorporated into the first and/or second component, or added before, along with, or after the introduction of the first and/or second component, non-limiting examples of which include surfactants, surface bond enhancers (non-limiting examples include styrene butadiene latex, polyvinal alcohols, resins, other adhesives), emulsifiers, ph control agents, fluid loss additives, gas prevention additive, dispersants, expanding agents, and wetting agents.

Although the present invention has been illustrated by preferred reference to epoxy systems, it should be understood that any remediation composition having two or more components can be utilized in the present invention.

All materials cited herein, including but not limited to any cited patents, publications, articles, books, journals, brochures, are herein incorporated by reference.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A method of remediating a well having a well fluid residing in the well, the method comprising:
   (A) providing an epoxy resin component and an activator component, wherein the epoxy rein component and the activator component would if mixed have a density less than the density of the well fluid;
   (B) surface mixing the components and at least one weighting agent to form an epoxy system, wherein the system has a density greater than the density of the well fluid; and
   (C) placing the system in the well to be remediated.

2. The method of claim 1, wherein step (C) is carried out utilizing one or more of a dump bailer; pumping through tubing, drillpipe, work strings or tubulars; gravity flow; and bull heading.

3. A method of remediating a well having a well fluid residing therein, the method comprising:
   (A) providing an epoxy resin component and an activator component, wherein the epoxy rein component and the activator component would if mixed have a density less than the density of the well fluid;
   (B) surface mixing the components and at least one weighting agent to form an epoxy system, wherein the system has a density greater than the density of the well fluid;
   (C) placing the system in the well to be remediated; and
   (D) allowing the mixture to form a cement plug.

4. The method of claim 3, wherein steps (C) and (D) are carried out utilizing one or more of a dump bailer; pumping through tubing, drillpipe, work strings or tubulars; gravity flow; and bull heading.

5. A remediated well comprising: a well bore of an active well having a well fluid; and an epoxy mixture residing in the well bore, wherein the epoxy mixture comprises a weighting agent, an epoxy component and an activator component wherein if the epoxy component and the activator component were mixed have a density less than the density of the well fluid, and wherein the epoxy mixture has a density greater than the density of the well fluid.

* * * * *